(12) United States Patent
Lee

(10) Patent No.: US 8,789,066 B2
(45) Date of Patent: Jul. 22, 2014

(54) METHOD AND APPARATUS FOR PATH SEARCH THROUGH WEB BROWSING

(75) Inventor: Hee Back Lee, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 305 days.

(21) Appl. No.: 12/811,269

(22) PCT Filed: Jun. 29, 2008

(86) PCT No.: PCT/KR2008/003786
§ 371 (c)(1),
(2), (4) Date: Jun. 30, 2010

(87) PCT Pub. No.: WO2009/084787
PCT Pub. Date: Jul. 9, 2009

(65) Prior Publication Data
US 2010/0287572 A1    Nov. 11, 2010

(30) Foreign Application Priority Data
Dec. 31, 2007   (KR) ........................ 10-2007-0141711

(51) Int. Cl.
*G06F 3/00*   (2006.01)
*G06F 9/54*   (2006.01)
*G06F 17/30*  (2006.01)

(52) U.S. Cl.
CPC .......... *G06F 9/547* (2013.01); *G06F 17/30873* (2013.01)
USPC ....................................................... 719/311

(58) Field of Classification Search
CPC ...... G06F 9/54; G06F 9/547; G06F 17/30873
USPC .............................. 719/328, 330, 313; 710/20
See application file for complete search history.

(56) References Cited

U.S. PATENT DOCUMENTS

| | | | | |
|---|---|---|---|---|
| 5,918,012 | A | * | 6/1999 | Astiz et al. .................... 709/217 |
| 6,912,545 | B1 | * | 6/2005 | Lundy et al. ........................... 1/1 |
| 7,298,378 | B1 | * | 11/2007 | Hagenbuch et al. .......... 345/589 |
| 7,813,875 | B2 | * | 10/2010 | Yamamoto et al. ........... 701/484 |
| 2005/0203918 | A1 | * | 9/2005 | Holbrook ........................ 707/10 |
| 2006/0265121 | A1 | * | 11/2006 | Kuo et al. ..................... 701/209 |

(Continued)

FOREIGN PATENT DOCUMENTS

| | | |
|---|---|---|
| GB | 2 416 844 A | 2/2006 |
| JP | 2002-229880 | 8/2002 |
| JP | 2004-219238 | 8/2004 |
| KR | 10-2007-0050607 | 5/2007 |

OTHER PUBLICATIONS

Cyrus Shahabi, Knowledge Discovery from Users Web-Page Navigation, 1997.*
European Search Report for PCT/KR2008/003786 dated Dec. 29, 2010.

(Continued)

*Primary Examiner* — Lechi Truong
(74) *Attorney, Agent, or Firm* — Fox Rothschild LLP

(57) ABSTRACT

The path retrieval method includes retrieving a destination web page through a web browser of a navigation terminal, calling an application program through a user action in the retrieved destination web page, and transmitting destination location information to the application program, providing the destination location information to the navigation terminal by the application program, and requesting a path retrieval with respect to a destination, and retrieving a path to the destination based on the destination location information by the navigation terminal.

10 Claims, 3 Drawing Sheets

(56) References Cited

U.S. PATENT DOCUMENTS

| | | |
|---|---|---|
| 2007/0112506 A1 | 5/2007 | Kim et al. |
| 2008/0027642 A1* | 1/2008 | Winberry et al. ............. 701/212 |
| 2010/0017109 A1* | 1/2010 | Pauwels ........................ 701/200 |

OTHER PUBLICATIONS

International Search Report for PCT/KR2008/003786, mailed Jan. 9, 2009.

Written Opinion for PCT/KR2008/003786, mailed Jan. 9, 2009.

* cited by examiner

METHOD AND APPARATUS FOR PATH SEARCH THROUGH WEB BROWSING

This application is the U.S. national phase of International Application No. PCT/KR2008/003786 filed 29 Jun. 2008 which designated the U.S. and claims priority to KR Patent Application No. 10-2007-0141711 filed 31 Dec. 2007, the entire contents of each of which are hereby incorporated by reference.

TECHNICAL FIELD

The present invention relates to a path retrieval method through web browsing in a navigation terminal, and more particularly, to a path retrieval method and apparatus which may retrieve a web page through web browsing even without directly inputting an address and the like to the navigation terminal, thereby obtaining location information and retrieving a path.

BACKGROUND ART

In general, a navigation system is a system providing information used for navigation of vehicles using artificial satellites.

A typical navigation system may be embodied as a single terminal, and include a storage medium storing map data and a Global Positioning System (GPS) receiver for receiving GPS signals.

The navigation system may calculate and provide a current location of a vehicle, and calculate an optimum route to a desired destination to thereby guide the user while providing various information concerning the route.

In the navigation system, a wireless Internet is gradually generalized due to expansion in the use of Wireless Broadband Internet (WiBro), high speed downlink packet access (HSDPA), and the like, and a wireless Internet environment is promoted through various methods. In particular, the wireless Internet environment is expanded due to Internet access via Bluetooth and use of a universal subscriber identity module (USIM) card.

However, most Personal Navigation Devices (PNDs) or In-Car Navigation terminals rarely include a communication device mounted therein, so that a web browsing through a navigation terminal and a path retrieval through the web browsing are not provided.

DISCLOSURE OF INVENTION

Technical Goals

An aspect of the present invention provides a path retrieval method and apparatus which may retrieve a destination through web browsing in a navigation terminal including a communication device mounted therein, and automatically retrieve a path through a specific action of a user.

Technical Solutions

According to an aspect of the present invention, there is provided a path retrieval method through web browsing, the method including: retrieving a destination web page through a web browser of a navigation terminal; calling an application program through a user action in the retrieved destination web page, and transmitting destination location information to the application program; providing the destination location information to the navigation terminal by the application program, and requesting a path retrieval with respect to a destination; and retrieving a path to the destination based on the destination location information by the navigation terminal.

In this instance, the user action may push a location transmission button in the calling and the transmitting.

According to another aspect of the present invention, there is provided a path retrieval apparatus through web browsing, the apparatus including: a web retrieval unit to retrieve a destination through a communication device of a navigation terminal; an application program storing unit to store an application program for receiving location information of retrieved destination web page; an application program calling unit to call the application program when a user action provides an input to the retrieved destination web page; a location information receiving unit to receive the location information of the destination web page received by the application program; and a path retrieval unit to retrieve a path based on the location information received from the location information receiving unit.

Advantageous Effects

As described above, according to the present invention, a user may retrieve the destination through the web browser of the navigation terminal without directly inputting the destination address, so that the path to the destination is automatically retrieved through the user specific action.

According to the present invention, the destination web page may be retrieved through web browsing even when the user does not know the precise destination address and the like, so that the path to the destination is automatically retrieved.

BEST MODE FOR CARRYING OUT THE INVENTION

Figure 1:
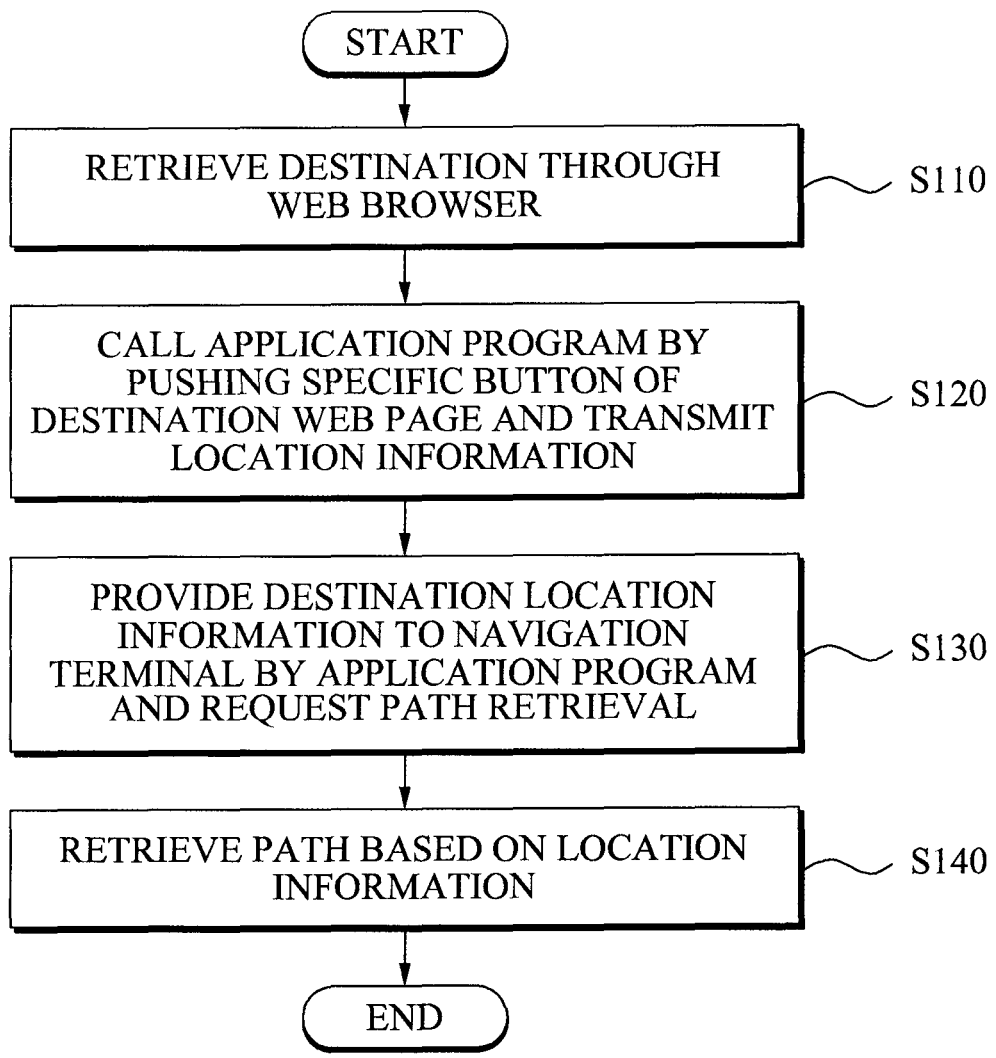
FIG. 1 is a flowchart illustrating a path retrieval method through web browsing according to an exemplary embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a flowchart illustrating a path retrieval method through web browsing according to an exemplary embodiment of the present invention. Referring to FIG. 1, in operation S110, a user retrieves a desired destination through a web browser of a navigation terminal including a communication device mounted therein.

According to the present exemplary embodiment, in order to retrieve a path using the navigation terminal, the destination may be retrieved through web browsing without directly inputting an address and the like.

As an example, a user retrieves 'recommended restaurants around Gang-Nam station' through the web browser of the navigation terminal when wishing to retrieve information concerning restaurants around Gang-Nam station and to select one from restaurants of a retrieval result list to thereby retrieve a path to the selected restaurant through the web browser. Specifically, the user may finally select a desired restaurant from the retrieval result list, and then the navigation terminal may retrieve a path to the desired restaurant.

As another example, a destination may be retrieved through category retrieval. Specifically, when an upper category such as 'restaurant', 'government office', 'hospital', 'school', and the like is exhibited via a screen to a user, the user may select a desired category from the upper category and then further select a lower category. For example, the user selects an upper category of 'restaurant' and then selects a lower category of 'Japanese food' from among categories such as 'Korean food', 'Chinese food', 'Japanese food', 'Western food', and 'etc.' belonging to the restaurant of the upper category when wishing to retrieve 'sushi restaurant'. A list of sushi restaurants is provided to a user when 'sushi' is selected from lower categories such as 'sushi', 'Japanese pork cutlet', 'Japanese noodle', and the like of the selected 'Japanese food', so that the user may select a desired web page from the list.

In operation S120, an application program is called by pushing a specific button on a destination web page in order to receive destination location information on a web page of the destination retrieved in operation S110, and the destination location information of the web page is transmitted to the application program.

As an example, when a user retrieves information concerning a restaurant around Gang-Nam station, and selects a specific web page to push a location transmission button previously formed on the web page, a plug-in program or control Application Program Interface (API) connected with a web browser is called, and destination location information on the web page is transmitted to the plug-in program or control API.

In operation S130, the called application program transmits the destination location information to the navigation terminal, and requests a path retrieval based on the transmitted destination location information.

As an example, the destination location information transmitted to the application program such as the plug-in program and the like by pushing the location transmission button is re-transmitted to the navigation terminal, and the application program requests the navigation terminal to retrieve a path with respect to the destination location information.

In operation S140, a location of the destination location information transmitted to the navigation terminal is determined as the destination to thereby automatically retrieve a path.

As described above, the user may retrieve the path through web browsing without directly inputting an address and the like to the navigation terminal. In particular, the user retrieves a web page to receive location information of a destination and retrieves a path of the destination, even when the user does not accurately know the address.

Figure 2:
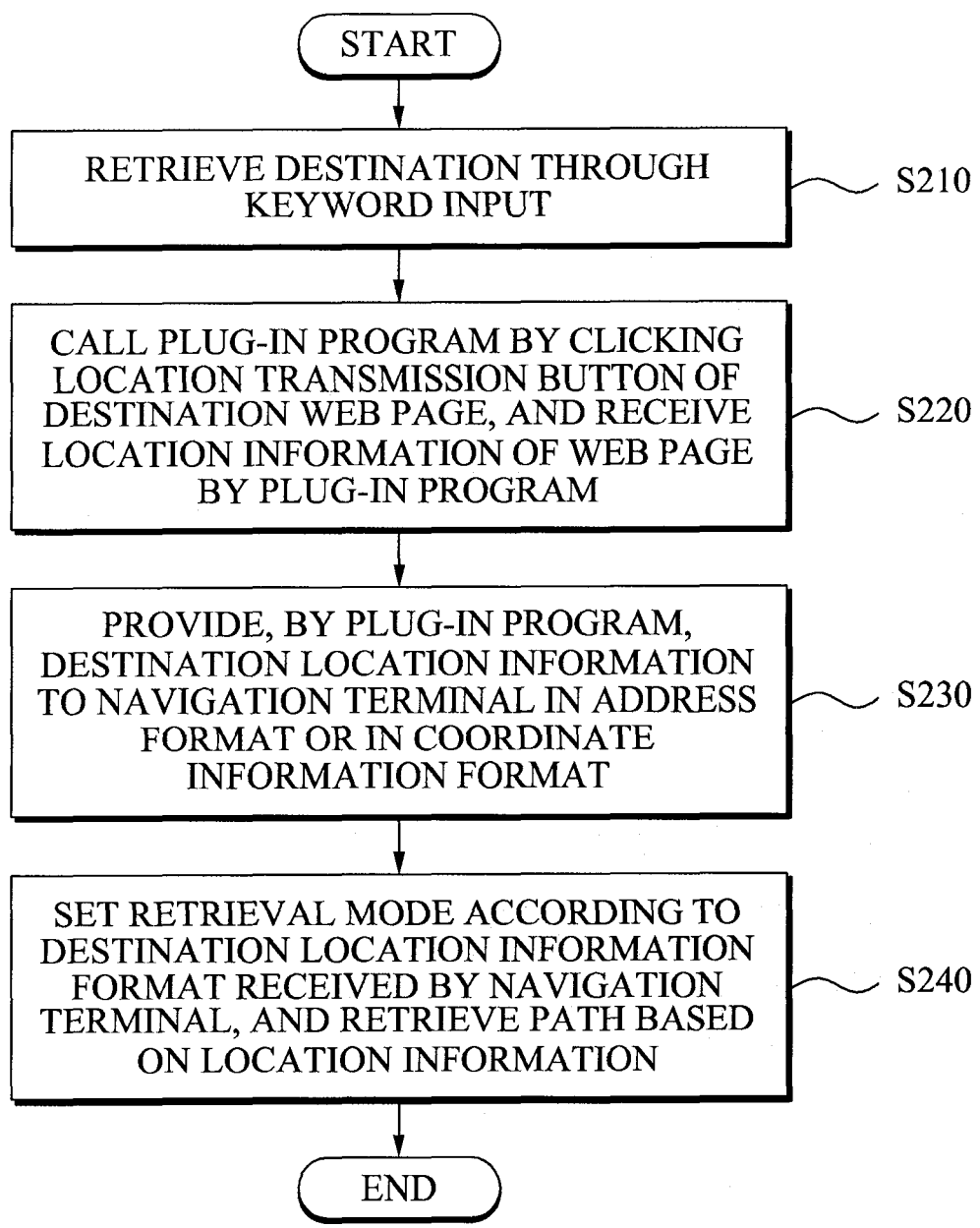
FIG. 2 is a flowchart illustrating a path retrieval method through web browsing according to another exemplary embodiment of the present invention.

FIG. 2 is a flowchart illustrating a path retrieval method through web browsing according to another exemplary embodiment of the present invention.

Referring to FIG. 2, in operation S210, a user inputs a keyword in a web browser in order to retrieve a path to a destination, thereby retrieving the destination.

Specifically, a keyword such as dermatology hospitals around Hak-Dong station is inputted to perform web browsing without directly inputting an address of the destination to the navigation terminal when a user does not know the precise address, and then the user may select a desired web page from a retrieval result list.

Also, a desired location may be retrieved while narrowing a range of location data stored in the navigation terminal starting from upper categories to lower categories of the location data.

In operation S220, the location transmission button previously formed on the retrieved destination web page is clicked to call a plug-in program, and the plug-in program receives location information of the destination web page.

Specifically, the destination web page retrieved by the user includes the location transmission button. Thereby, the plug-in program is called and at the same time location information of the destination web page is transmitted to the plug-in program when clicking the location transmission button.

In this instance, the location information transmitted to the plug-in program may be transmitted either in a destination address format or in a coordinate information format. Specifically, the location information may be selected to be transmitted in the destination address format or in the coordinate information format upon manufacturing web pages.

In operation S230, the plug-in program to which the location information is transmitted provides the location information to the navigation terminal in the address format or in the coordinate information format.

Specifically, according to the format of the location information received in operation S220, the location information is transmitted to the navigation terminal in the same format. As an example, similar to the plug-in program receiving the location information in the coordinate information format, the navigation terminal may receive the location information in the coordinate information format.

In operation S240, a retrieval mode is set as a coordinate information retrieval mode when the navigation terminal receives the location information in the coordinate information format, and a path of the destination may be automatically retrieved according to the coordinate information retrieval mode. Similarly, the destination information is retrieved in an address retrieval mode when the navigation terminal receives the location information in the destination address format.

Figure 3:
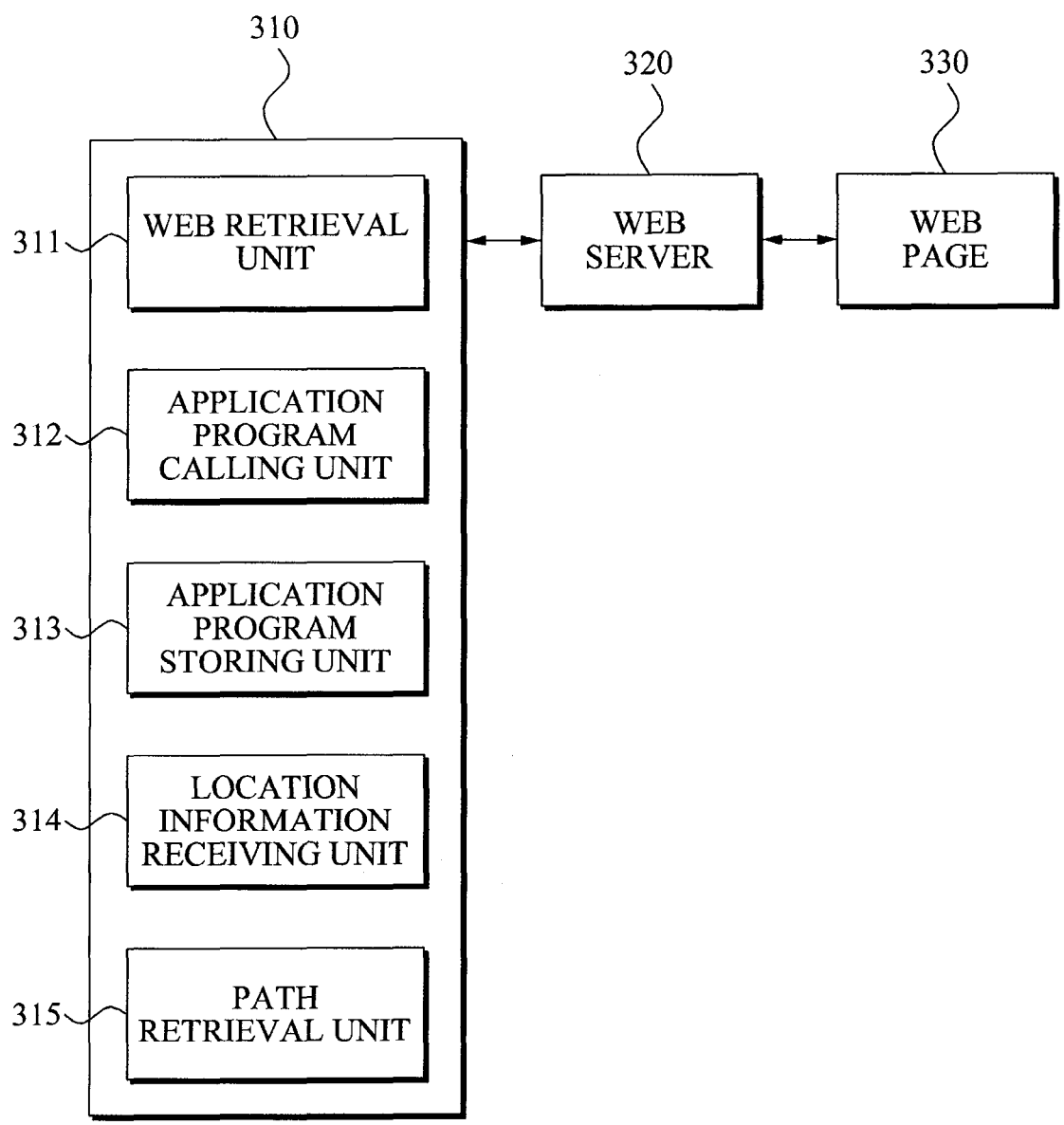
FIG. 3 is a block diagram illustrating a path retrieval apparatus through web browsing according to an exemplary embodiment of the present invention.

FIG. 3 is a block diagram illustrating a path retrieval apparatus 310 through web browsing according to an exemplary embodiment of the present invention.

Referring to FIG. 3, the path retrieval apparatus 300 includes a web retrieval unit 311, an application program calling unit 312, an application program storing unit 313, a location information receiving unit 314, and a path retrieval unit 315.

The web retrieval unit 311 may retrieve a desired destination through a keyword input of a user using a communication device mounted in the navigation terminal and a web browser.

Specifically, the web browser is connected with a web server through the communication device to retrieve web pages when the user retrieves information concerning a restaurant through the keyword input, and a result list is outputted to the user.

The application program calling unit 312 calls the application program such as a plug-in program stored in the application program storing unit 313 in order to receive, from the retrieved web page, location information concerning a place of the web page, and transmits the location information to the navigation terminal through the application program.

The location information receiving unit 314 receives the location information received from the web page by the application program, and transmits the location information to the path retrieval unit 315 for the purpose of path retrieval. In this instance, the location information received by the location information receiving unit 314 may be any one of an address format and a coordinate information format.

The path retrieval unit 315 retrieves a path of the destination based on the location information received from the location information receiving unit 314. In this instance, a path retrieval mode may be set according to a format of the location information received from the location information receiving unit 314, such as the address format or the coordinate information format.

The path retrieval method through web browsing according to the above-described exemplary embodiments of the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A path retrieval method through web browsing, the method comprising:
    receiving keyword information;
    performing a search through the web browser based on the keyword information;
    displaying a result list based on the search to select a destination for retrieving a path to the selected destination;
    retrieving a web page of the selected destination through a web browser of a navigation terminal;
    receiving a user action to receive destination location information on the web page of the selected destination;
    calling an application program that is one of a plug-in program and a control Application Program Interface to be connected with the web browser, and calling the plug-in program or the control Application Program Interface to transmit the destination location information to the application program;
    providing the destination location information as destination coordinate information to the navigation terminal by the application program, and requesting a path retrieval with respect to a destination in a coordinate retrieval mode;
    retrieving a path to the destination based on the destination location information by the navigation terminal; and
    displaying the retrieved path on a screen,
    wherein the web page includes a location transmission button and wherein the user action occurs by operating the location transmission button on the web page.

2. The method of claim 1, wherein the keyword information is received through category retrieval.

3. The method of claim 1, wherein the user action pushes the location transmission button in the calling and the transmitting.

4. The method of claim 1, wherein the calling and transmitting transmits the destination location information in a destination address format.

5. The method of claim 4, wherein the providing and the requesting provides the destination address to the navigation terminal, and requests the path retrieval in an address retrieval mode.

6. A non-transitory computer-readable recording medium storing a program for implementing any one of the methods of claim 1.

7. A path retrieval apparatus through web browsing, the apparatus comprising:
    a receiving unit and associated computer hardware to receive keyword information for performing a search through the web browser based on the keyword information and for displaying a result list based on the search to select a destination for retrieving a path to the selected destination;
    a web retrieval unit and associated computer hardware to retrieve a web page of the selected destination through a communication device of a navigation terminal;
    an application program storing unit and associated computer hardware to store an application program for receiving destination location information;
    an application program calling unit and associated computer hardware to call the application program that is one of a plug-in program and a control Application Program Interface to be connected with the web browser when a user action to receive destination location information, is received by the receiving unit, on the web page of the selected destination, and calling a plug-in program or a control Application Program Interface(API) to transmit the destination Program information to the application program;
    a location information receiving unit and associated computer hardware to receive the location information of the destination web page received by the application program in one of a coordinate information format and a destination address format to the navigation terminal; and
    a path retrieval unit to retrieve a path based on the location information received from the location information receiving unit, wherein the retrieved path is displayed on a screen;
    wherein the web page includes a location transmission button and
    wherein the user action occurs by operating the location transmission button on the webpage.

8. The apparatus of claim 7, wherein the keyword is received through category retrieval.

9. The apparatus of claim 7, wherein the application program calling unit calls the application program by the location transmission button being pushed by a user.

10. The apparatus of claim 7, wherein the path retrieval unit retrieves the path in a coordinate information retrieval mode or address retrieval mode according to the location information format received in the location information receiving unit.

* * * * *